Jan. 9, 1934.  J. W. WHITE  1,943,198
METHOD OF FORMING A BRAKE DRUM
Filed Jan. 8, 1932
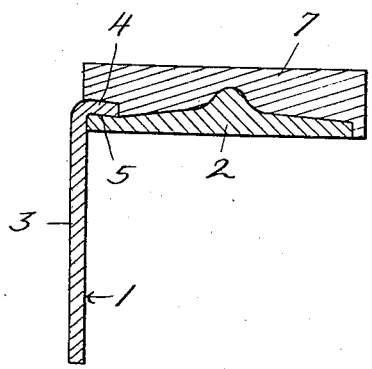
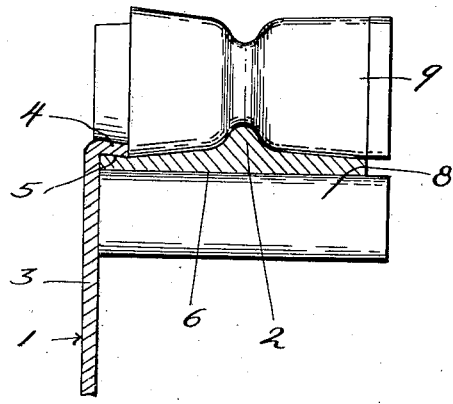
INVENTOR
John William White
BY
ATTORNEYS Patented Jan. 9, 1934

1,943,198

UNITED STATES PATENT OFFICE 1,943,198

METHOD OF FORMING A BRAKE DRUM

John William White, Detroit, Mich., assignor to Kelsey-Hayes Wheel Corporation, Detroit, Mich., a corporation of New York Application January 8, 1932. Serial No. 585,617

4 Claims. (Cl. 29—152.2)

The invention relates to brake drums and refers more particularly to brake drums for use with motor vehicles. One of the objects of the invention is to manufacture an improved brake engaging member formed of material having substantially uniform texture and provided with a surface formed of the same material, but of substantially uniform and better quality. Other objects are to form the brake engaging member by centrifugally casting the same and by subsequently rolling the surface of the member and to centrifugally cast the brake engaging member and roll the surface thereof while the member is hot and preferably before the member has lost too much of its casting heat. Further objects of the invention are to cast the brake engaging member upon a back plate and to subsequently roll the surface of the member and to roll the surface of this member while hot and preferably while still retaining to a great extent its casting heat.

These and other objects of the invention will become apparent from the following description, taken in connection with the accompanying drawing, in which Figures 1 and 2 are sectional views illustrating different steps in the manufacture of a brake drum.

The brake drum comprises the back plate or web 1 and the annular brake engaging member 2, which latter is secured to and carried by the former. The back plate is preferably formed of sheet metal and drawn to shape and in the present instance has the body 3 and the peripheral transverse flange 4, which preferably has its inner face tapered outwardly from the body. The brake engaging member is a centrifugal casting preferably formed of steel and has its inner peripheral portion 6 providing the brake engaging surface rolled. As a result, the material, which is preferably steel, forming the brake engaging member is very pure and close grained and has no seams or pipes. Furthermore, the material providing the brake engaging surface of this member is more perfectly formed and finished and of better quality.

In the manufacture of the brake drum, I locate the back plate 1 within the mold 7, which latter is formed in a suitable manner as by means of radially movable sections which are adapted to have end to end engagement. This collapsible mold with the back plate is then rotated and the molten metal is poured into the mold when rotating at the desired R. P. M. and upon the back plate and more particularly within its peripheral flange 4 and against the portion of the body 3 adjacent this flange. This molten metal fuses and molecularly bonds with the back plate, the latter being preheated, if necessary, to secure this result. The casting formed in this manner is of substantially the final shape and size.

After the centrifugal casting operation, the brake drum is removed from the mold and before the brake engaging member loses too much casting heat and while it is still hot it is operated upon by the inside and outside rolls 8 and 9, respectively. These rolls operate upon the brake engaging member to more perfectly form and finish the same to its desired final shape and size and in rolling the brake engaging member bring up or improve the structure and quality of its metal and more particularly the metal forming its inner peripheral portion 6, which latter provides the inside brake engaging surface. This inner peripheral portion may then be operated upon by machining or grinding to form the finished brake engaging surface. However, if desired, the rolling of the brake engaging member may be continued to accurately finish the same including the brake engaging surface.

What I claim as my invention is:

1. In the method of forming a brake drum, the centrifugal casting of an annular brake engaging member within a mold to a back plate and the subsequent rolling of a surface of the member while hot.

2. In the method of forming a brake drum, the centrifugal casting of an annular brake engaging member within a rotating mold to a rotating back plate and the subsequent finishing of a surface of the member while retaining some of its casting heat by rolling the same.

3. In the method of forming a brake drum, the centrifugal casting of an annular brake engaging member to a back plate and the subsequent rolling of a surface of the member.

4. In the method of forming a brake drum, the centrifugal casting of an annular brake engaging member within an annular portion of a second member and the molecular bonding of the brake member and the annular portion and engaging member and the subsequent rolling of the inner periphery of the brake engaging member.

JOHN WILLIAM WHITE.